United States Patent
Pagella et al.

[11] 3,789,473
[45] Feb. 5, 1974

[54] MACHINE TOOL HAVING AUTOMATIC MEANS FOR TOOL-CHANGE

[75] Inventors: Elio Pagella; Giorgio Ollearo, both of Ivrea, Italy

[73] Assignee: Ing. C. Olivetti & C., S.p.A., Ivrea, Torino, Italy

[22] Filed: Oct. 15, 1971

[21] Appl. No.: 189,501

[30] Foreign Application Priority Data
Oct. 31, 1970  Italy .............................. 70639 A/70

[52] U.S. Cl. ................................... 29/568, 211/1.5
[51] Int. Cl. ............................................. B23q 3/157
[58] Field of Search ............................. 29/568, 26 A

[56] References Cited
UNITED STATES PATENTS

| | | | |
|---|---|---|---|
| 3,571,912 | 3/1971 | Kielma | 29/568 |
| 3,173,204 | 3/1965 | Anthony | 29/568 |
| 3,414,967 | 12/1968 | Erikson | 29/568 |
| 3,466,739 | 9/1969 | Harman | 29/568 |
| 3,530,570 | 9/1970 | Shotter | 29/568 |
| 3,576,540 | 4/1971 | Fair et al. | 29/568 X |
| 3,650,018 | 3/1972 | Perry et al. | 29/568 |

*Primary Examiner*—Andrew R. Juhasz
*Assistant Examiner*—Z. R. Bilinsky
*Attorney, Agent, or Firm*—Birch, Swindler, McKie & Beckett

[57] ABSTRACT

A machining center has a tool magazine in the form of an endless track. The tools are each mounted in an individual carriage, the carriages being packed end-to-end in the track and being drivable along it. A tool-change station is defined by a gap in the track from which one carriage may be removed for insertion of the tool into the machine spindle. A main tool-change incorporates a section of the track which completes the magazine track when this arm is in one position, and an auxiliary or carrier arm completes the track when the main arm is located away from the track. To avoid direct reading of the tools or carriages (which change their order in the magazine as tools are used and replaced) a simulator track is provided along which elements simulating the tools or carriages are driven simultaneously with the drive to the carriages. A reading device reads distinctive indicia on the simulator elements as they pass a reading station, and a signal is generated which governs the movement of the carriages and simulator elements. When a simulator element corresponding to a fresh tool required is read, the drive is stopped with this tool in the correct position for the first stage of tool-change.

17 Claims, 20 Drawing Figures

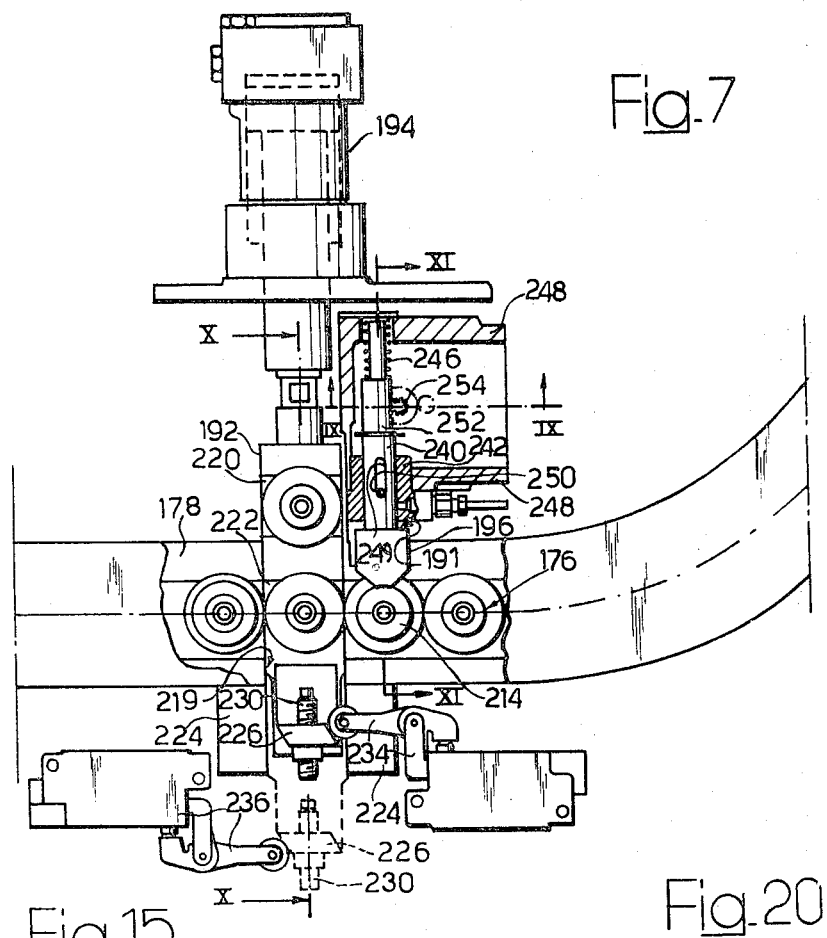
Fig.7
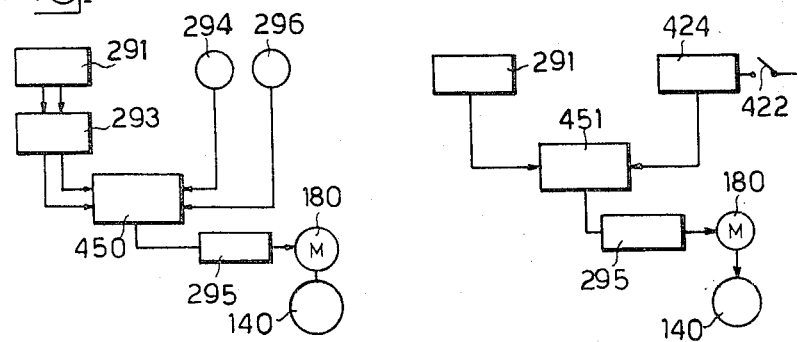
Fig.15
Fig.20

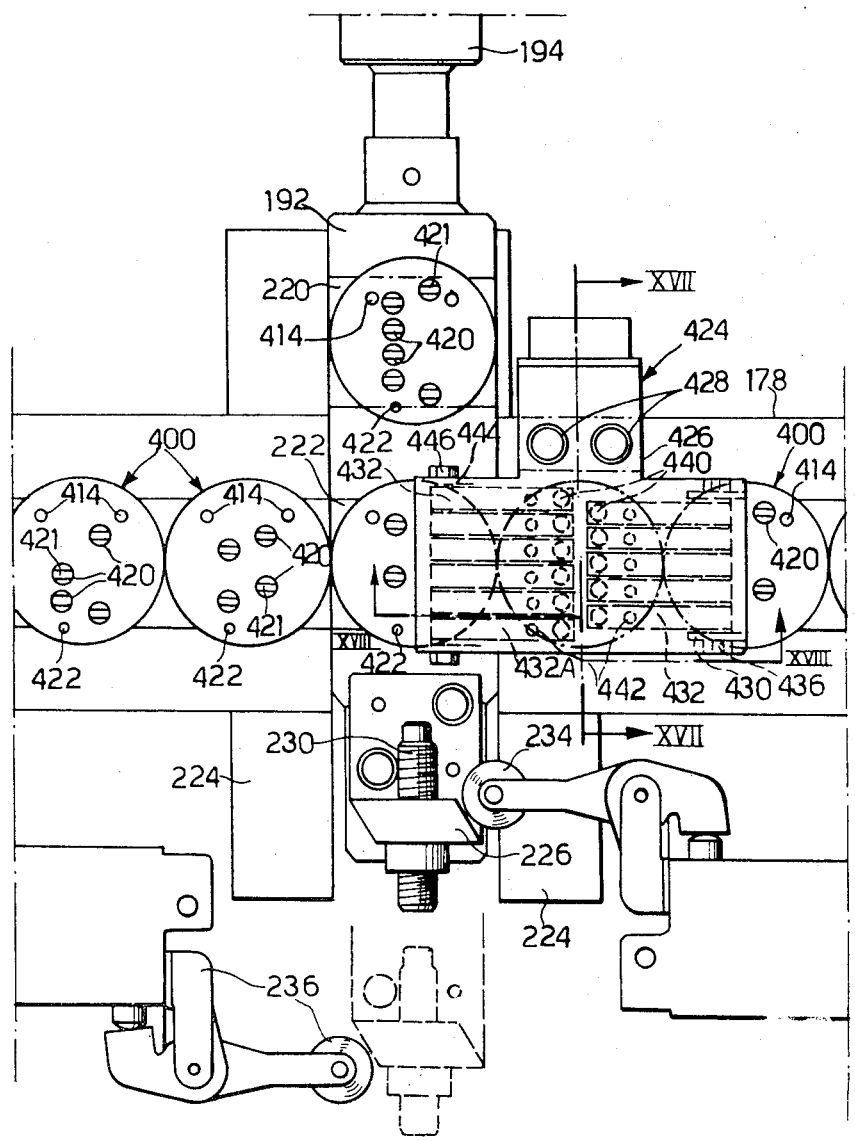

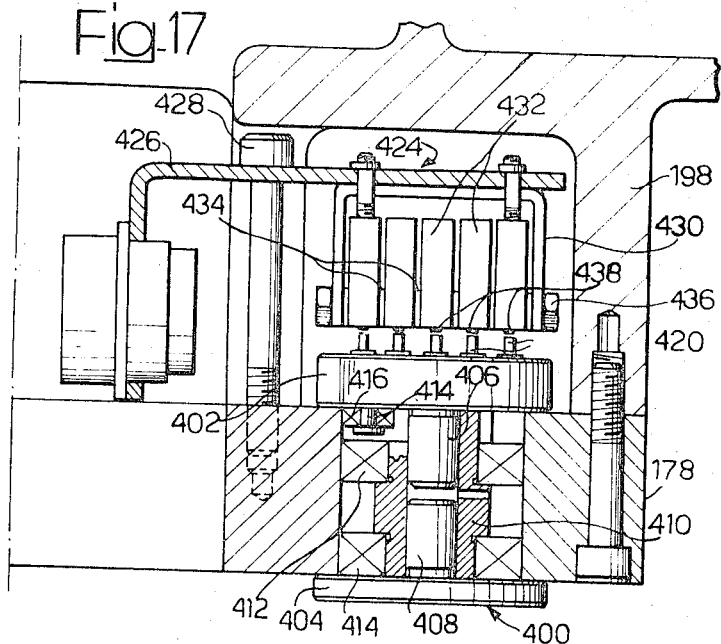
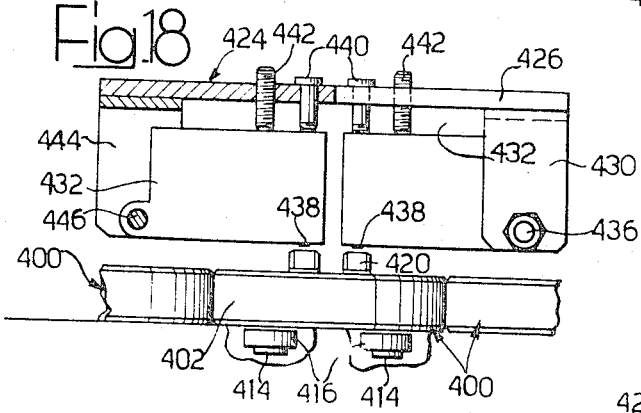
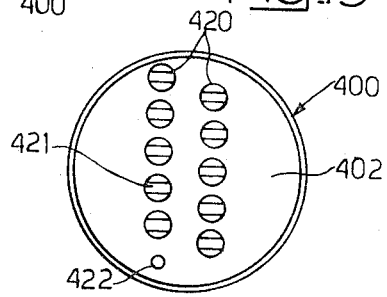

3,789,473

MACHINE TOOL HAVING AUTOMATIC MEANS FOR TOOL-CHANGE

This invention relates to so-called machining centres, which are large machine tools generally controlled by a computer to perform a series of machining operations on a workpiece using different tools in sequence. The tools are stored in a magazine that forms part of the machine and are individually drawn from it by automatic means and inserted in a spindle, being returned to the magazine after use and replaced by the next tool required.

Various types of machine tool with automatic tool-change are known. In one known type, the tools are located in a storage magazine in a predetermined position. A fresh tool is selected and removed from the magazine only when the previously used tool has been returned to the magazine, so that tool-change is relatively slow.

In another type of this machine the tools are located at random in the magazine and are provided with identifying indicia. The selection of a new tool is carried out during working of the previous tool, under the control of a device for reading the tools or their holders. The used tool is then exchanged for that selected, whose position it then occupies in the magazine. Thus there is simultaneous return of the used tool to the magazine and introduction of the new tool into the spindle. These machines are rather costly because, for one thing, the identifying indicia must be made on all the tools or their holders, whose number may be much greater than the number of positions for tools which exists in the magazine.

An object of the invention is to provide a machine which eliminates the above-mentioned drawbacks of the known machines, and in particular which makes it necessary either to retain the tools in a fixed order in the magazine or to provide an identification system by which each tool is directly identified by a reading device or the like.

The invention provides a machine tool with automatic tool-change, including a spindle, a series of tools, a magazine for the tools, means to move the tools in a path which includes a tool-change station, and tool-change means to transfer a tool from the tool-change station to the spindle; characterised by a simulator track simultaing the path of the tools and a series of simulator elements movable along the simulator track and carrying identifying indicia so that each simulator element corresponds to a tool; a reading device located at a reading station on the simulator track and adapted to read the identifying indicia of the simulator elements as they pass the reading station, and means to cause the arrest of the tool and simulator elements when the reading device reads a simulator element corresponding to a required tool located at a predetermined position in the path of the tools.

In a preferred form, the simulator elements are slidable along an endless simulator track that includes a shunting station where the simulator element corresponding to the tool at the moment connected to the spindle can be temporarily isolated while the next tool required is identified and moved into position for the first stage of tool-change. The shunting station accommodates a slide movable transversely in a gap in the simulator track defining the shunting station. The slide has two compartments each corresponding to a length of the simulator track sufficient to accommodate one simulator element, the slide being movable between a first position in which a first compartment occupies the gap in the simulator track while the second compartment is isolated from the simulator track, and a second position in which the position of the compartments is reversed.

An embodiment of the invention is described below with reference to the accompanying drawings, in which:

FIG. 7 is a partly sectioned plan view through a part of the simulator unit of the machine of the preceding figures;

FIG. 14 is a view on an enlarged scale along the line XIV—XIV of FIG. 8;

FIG. 15 is a block diagram showing the inter-relationship of certain of the components of the machine of the preceding figures;

FIG. 16 is a plan view, corresponding to FIG. 7, but on a larger scale, of a modified reading device;

FIG. 17 is a view on an enlarged scale on the line XVII—XVII in FIG. 16;

FIG. 18 is a view on an enlarged scale on the line XVIII—XVIII in FIG. 16;

FIG. 19 is a plan view on an enlarged scale of a simulator element as used in conjunction with the reading device of FIGS. 16 to 18; and FIG. 20 is a block diagram showing the inter-relationship of certain of the components of a machine with the reading device of FIGS. 16 to 19.

GENERAL CONSTRUCTION

Figure 1:
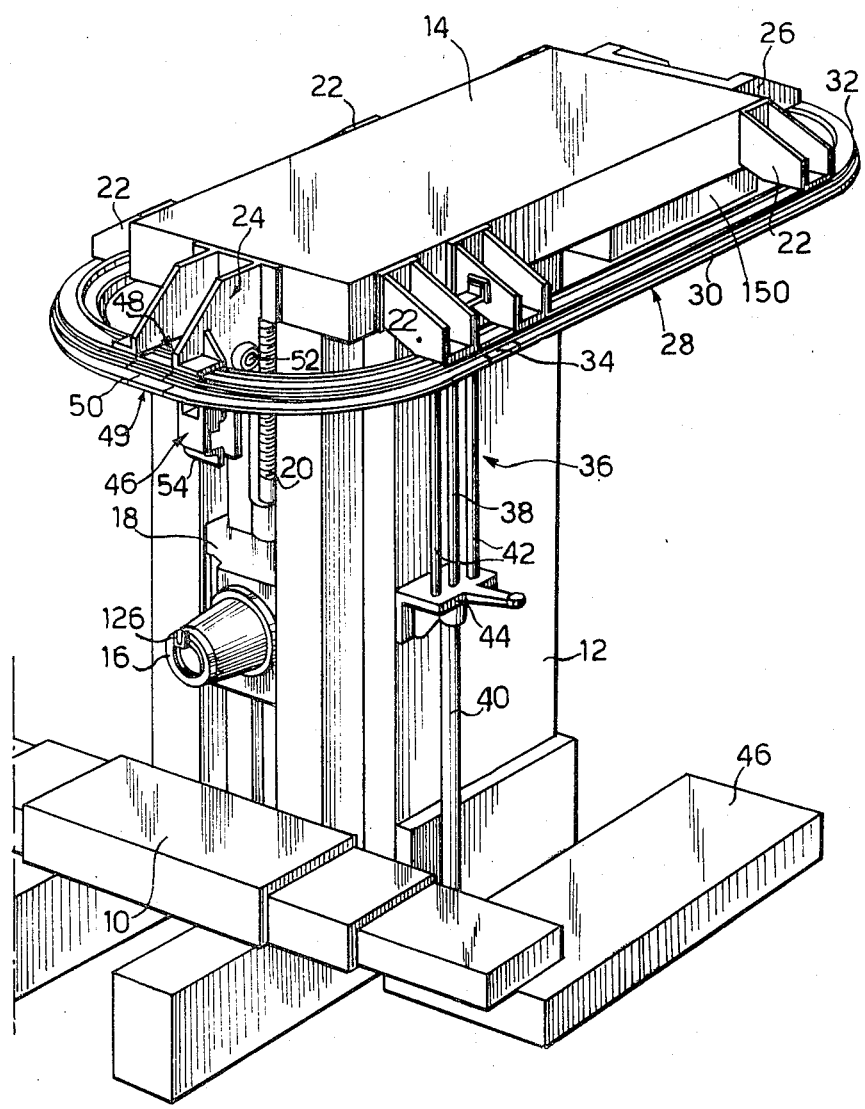
FIG. 1 is a perspective view from above of a machining centre, certain parts being omitted.

FIG. 1 shows a machining centre having a table 10 for supporting a workpiece, a column 12 with a rectangular cap 14, and a spindle 16 mounted on a saddle 18 that is movable vertically on a screw 20 between a lower working position and an upper tool-change position. The spindle is driven by conventional means, not illustrated.

The cap 12 has several outwardly projecting suppoort brackets 22 secured to its sides, and another support bracket 24 at its front end above the spindle 16. At its rear end is a further bracket 26, seen only partially in FIG. 1. Gripped by the brackets 22, 24 and 26 and extending around the cap 14 is an endless track 28 lying on a horizontal plane. In practice the track 28 carries a series of carriages not illustrated in FIG. 1, and with the carriages forms a storage magazine for tools. The track is composed of rectilinear portions 30 running parallel to the sides and ends of the cap and radiused portions 32 joining the rectilinear portions.

A portion 34 of the track is incorporated in a tool substitution device 36 located between two of the brackets 22, the track portion 34 being fixed to the upper end of a rod 38 that is vertically telescopable in a pillar 40. Two fixed rods 42 guide the track portion 34. The lower limit of travel of the track portion 34 is defined by a base plate 44. The tool substitution device 36 allows a carriage held in the track section 34 to be lowered to the base plate 44 for initial loading of a tool into the carriage or for substitution of the tool. These operations are performed by an operator standing on a platform 46, the base plate 44 being at a convenient height to allow man-handling of the tool. The controls and actuating means for the tool substitution device are not shown, not forming part of this invention. The device is more fully described and claimed in patent application U.S. Ser. No. 167,771 filed July 30, 1971.

In FIG. 1, a tool change member in the form of a main arm 46 is seen in a lowered position below the bracket 24. A carrier member in the form of a secondary arm 48 is also seen in a lowered position in which an auxiliary track section 50 which it carries completes the magazine track 28, occupying a tool-change station 49 formed by a gap in the track 28 at the bracket 24. The arms 46 and 48 are mounted for pivotal movement about the axis of a shaft 52 that is set in bearings in the bracket 24.

Figure 2:
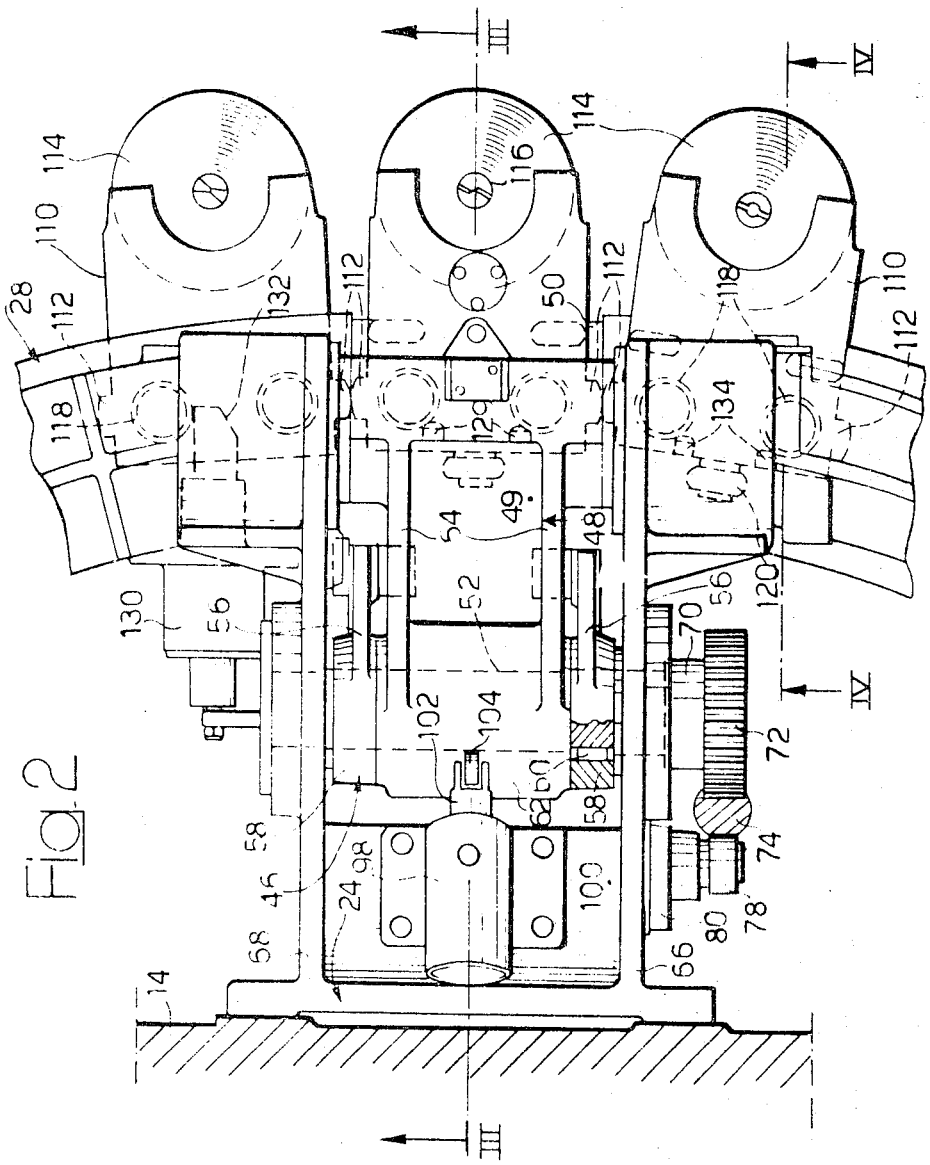
FIG. 2 is a plan view of a part of the machine of FIG. 1 showing the tool-change station.
Figure 3:
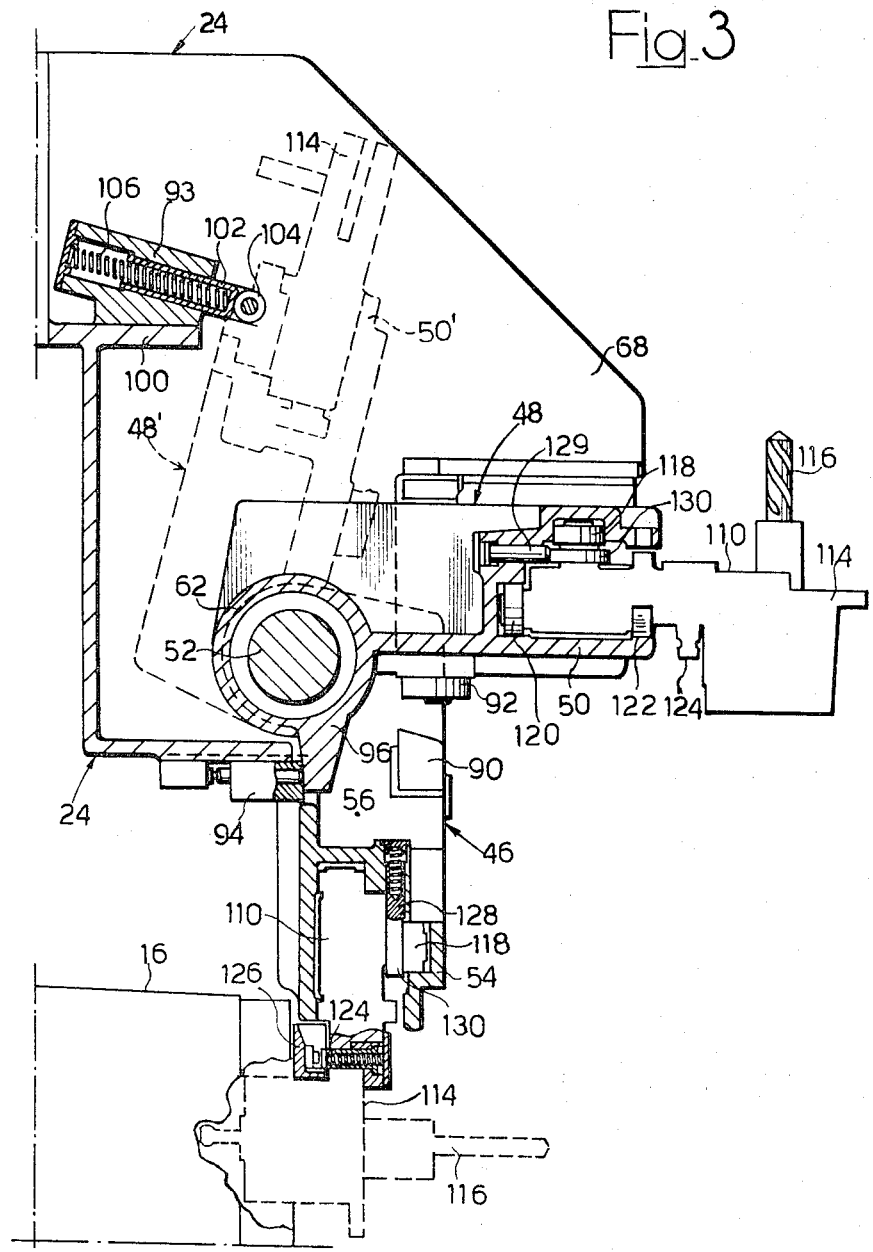
FIG. 3 is a sectional view along the line III—III of FIG. 2.
Figure 4:
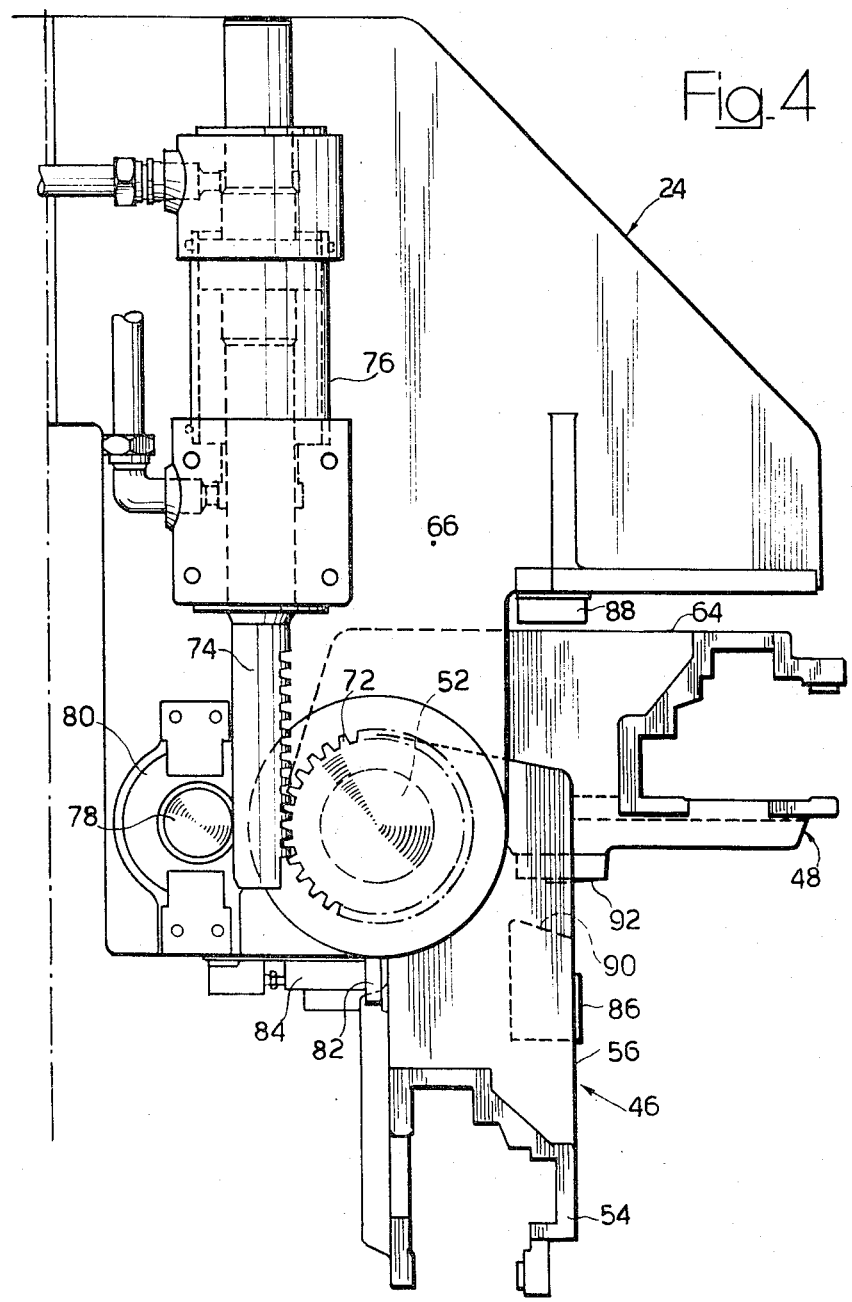
FIG. 4 is a section on line IV—IV of FIG. 2, certain parts being omitted.

Details of the main and secondary arms are seen in FIGS. 2, 3 and 4. The main arm 46 has a free end formed by a track portion 54 which, when the arm 46 is in a raised first position, completes the track 28 at the tool-change station 49. The arm 46 has two limbs 56 (FIG. 2) projecting back from the track portion 54 and each carrying a bush 58 that is connected to the shaft 52 by a key 60. The limbs 56 and bushes 58 straddle a single elongated bush 62 which is rotatable on the shaft 52 on bearings (not seen) located at its ends. The bush 62 is connected by limbs 64 to the auxiliary track section 50 of the secondary arm 48. In this way the secondary 48 is freely rotatable on the shaft 52. The bush 62 is prevented from moving axially by the bushes 58 of the main arm 46, which are themselves retained axially by suitable spacers between two limbs 66, 68 of the bracket 24.

The shaft 52 extends through the limb 66 of the bracket 24 and has an enlarged end 70 to which is rigidly attached a pinion 72. The pinion is rotated by a vertically extending rack 74 (FIG. 4) which is the stem of a double-acting hydraulic cylinder 76 of a known type. The interior construction and supply circuit of the cylinder 76 are not shown. The cylinder 76 includes known means to dampen the movement of its piston as it approaches both the upper and lower end of its stroke.

The rack 75 is supported against lateral force by an idle roller 78 mounted on a support 80 that is fixed to the limb 66 of the bracket 24.

The main arm 46 is movable with the shaft 52 under the action of the cylinder 76 between a first position in which its track section 54 is aligned with and completes the magazine track 28 at the tool-change station 49, and a second position, seen in FIGS. 1 to 4, in which it is rotated through 90°. The limits of its stroke are accurately defined by stops. More particularly, in the second position a block 82 (FIG. 4) fixed on one of the limbs 56 of the arm 46 contacts a block 84 fixed on the limb 66 of the bracket 24. In the first position a stop block 86 also fixed on the limb 56 contacts a block 88 fixed on the limb 66.

The arm 48 is moved between its first and second positions by the arm 46, acting through a block 90 on each limb 56 of the arm 46, which block engages a resilient block 92 on each limb 64 of the arm 48. While the main arm 46 moves through 90° between its first and second position, the secondary arm 48 moves through only approximately 75°. It is seen in its second or lowered position in FIGS. 1 to 4, with its track section 50 completing the track 28 at the tool-change station. Its first or raised position is seen in ghost lines in FIG. 3, indicated by 48'. In its second position it is stopped positively by a block 94 fixed on the bracket 24 and contacting a lug 96 forming part of the bush 62. The arrangement is such that on lowering of the two arms 46 and 48 the lug 96 strikes the block 94 to end the movement of the secondary arm 48 at a point when the main arm 46 is still about 15° from its second position. The block 90 thus separates at this stage from the block 92. On upward movement of the main arm 46, the main arm conversely travels through about 15° before the block 90 strikes the block 92 to raise the secondary arm 48.

A final portion of the upward movement of the secondary arm 48 is dampened by a buffer or shock absorber 98 fixed on a plate 100 attached to the bracket 24 and located between the limbs 66 and 68. The buffer 98 has a plunger 102 with a roller 104 (FIG. 3) at its free end, the roller 104 engaging the track portion 50 of the arm 48 when this arm approaches the upper limit of its stroke. The plunger 102 is biased outwardly by a spring 106.

The arrangement described above, in which the two arms 46 and 48 are not rigidly attached to each other, has the advantage that space can be conserved rearwardly of the raised position 48' of the secondary arm 48. This space may be useful in certain embodiments where a screw 20 (FIG. 1) projecting above the level of the cap 14 is necessary. The arms 46 and 48 might be rigidly connected, however.

As is seen in FIGS. 2 and 3, the track 28 is packed with carriages 110 that contact each other in bosses 112 that transmit driving force. Each carriage 110 releasably carries a tool holder 114 in which is mounted a tool 116. In order to slide stably and with minimal friction along the track 28, each carriage 110 has a pair of upper rollers 118, an end roller 120, and two lower rollers 122 (FIG. 3). A locking device retaining the tool holder 114 in place includes a spring-biased pin 124 which, in the second position of the main arm 46, contacts a shaped body 126 on the spindle 16 to release the tool holder from the carriage and allow it to be inserted in the spindle 16. The spindle 16 is then lowered to its working position.

The general construction of the carriages 110 and tool holder 114 and the means for ensuring that a tool holder is properly inserted into and removed from the spindle 16 are as described in the above-mentioned patent application.

The track section 54 of the main arm 46 has a pair of spring-biased pins 128 that engage rollers 130 coaxial with the rollers 118 on the carriages 110 in order to centre a carriage 110 properly in that track section and hold it lightly in place. When the carriages 110 are driven around the track 28, the pins 128 yield and return as each carriage 110 passes the tool-change station. There are similar pins 129 in the track section 50 of the secondary arm.

Adjacent the tool-change station 49, next to the limb 68 of the bracket 24 (FIG. 2), is an arrest device 130 which includes a bar 132 biased to project into the track 28 and to form a stop contacting a roller 118 on the carriage 110 and preventing the carriage from moving in a clockwise direction as viewed in FIG. 2. The bar 132 is retracted when necessary by hydraulic means, not illustrated. Next to the other limb 66 of the bracket 24 is, on the other hand, a pair of pins 134 which are similar in function to the pins 128 and 129 in the track sections 54, 50 of the two arms.

Figure 5:
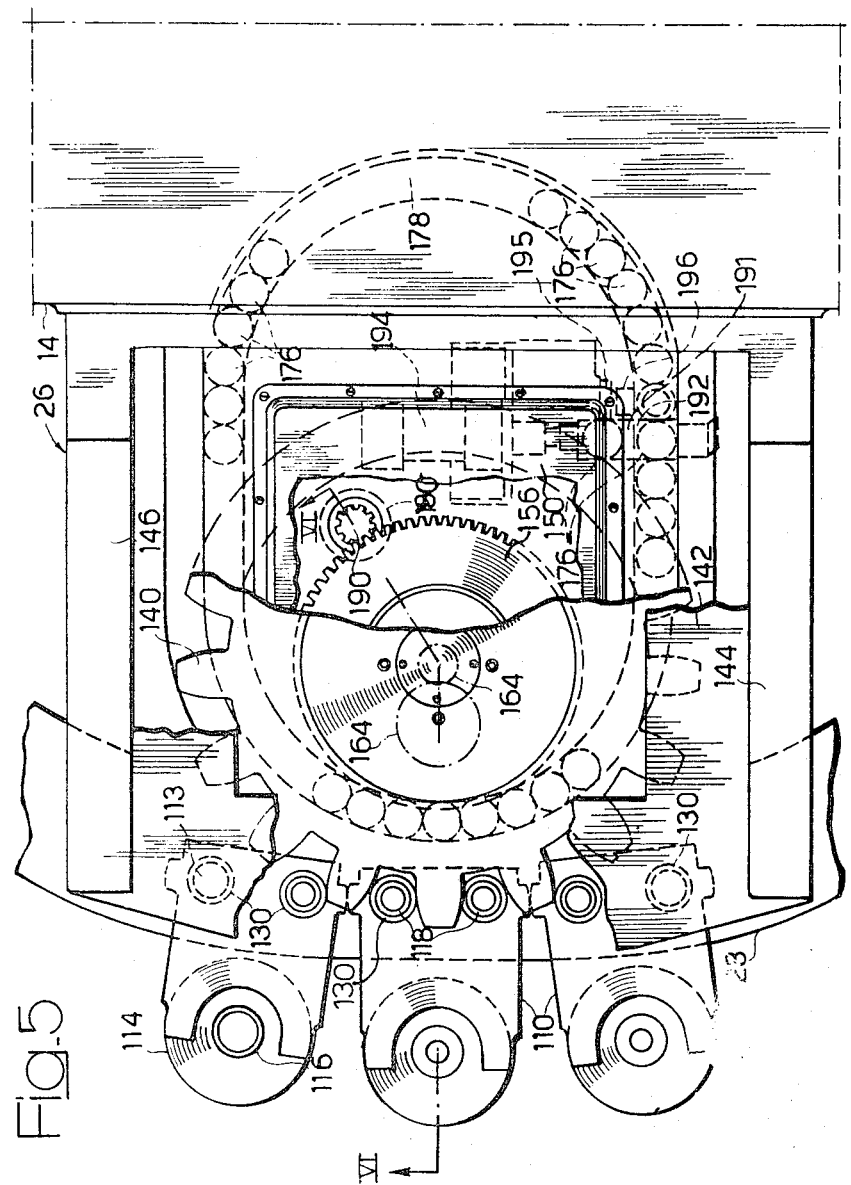
FIG. 5 is a plan view, partly broken away, of the rear part of the machine of the preceding figures.

The carriages 110 are driven around the track by a toothed wheel 140 seen partly in ghost lines in FIGS. 5 under a plate 142 which extends between two limbs 144 and 146 of the bracket 26. The teeth of the wheel 140 engage between the rollers 130 on the carriages in the manner seen in FIG. 5, that is, with one tooth between the two rollers 130 of one carriage, and the adjacent tooth engaging between two rollers 130 on two neighbouring carriages 110. The drive means for the wheel 140 will be described later.

Not illustrated are a computer programmed to cause the machine to carry out a sequence of operations on a workpiece, and various electrical and hydraulic circuits to command and co-ordinate the various functions of the machine. These parts of the machine are of types generally known in the art and require no discussion.

MANNER OF TOOL-CHANGE

The stages of operation of the machine in changing a tool will now be briefly outlined.

Assuming that work has commenced on a workpiece held on the table 10 (FIG. 1), a tool 116 in its tool holder 114 will be gripped in the spindle 16 of the machine, which will be in its lower or working position. The main arm 46 will be in its second or lowered position as seen in FIGS. 1 to 4, and the secondary arm 48 will also be in its second or lowered position and completes the track 28.

While the tool is working on the workpiece, the carriages 110 are driven along the track 28 by the wheel 140 in an anticlockwise direction (as viewed in FIG. 2) with the bar 132 of the arrest device 130 retracted, until the carriage 110 carrying the next tool required is located immediately adjacent the tool-change station 49 at the limb 66 of the bracket 24. The bar 132 of the arrest device 130 is then extended to project between the rollers 118 of the carriage located at the limb 69 of the bracket 24. The carriages 110 are then driven for a short distance in a clockwise direction until one of the rollers 118 on the carriage 110 located at the limb 68 of the bracket 24 engages the bar 132 and is arrested. The reversal of direction thus ensures accurate positioning of the carriage 110 carrying the next tool required immediately adjacent the tool-change station 49, where it is held in position by the pins 134. Another carriage 110 is held in position by the pins 129 in the track section 50 of the secondary arm 48 at the tool-change station.

At this stage the spindle 16 is raised to reinsert the tool holder 114 it carries in the empty carriage 110 carried by the track section 54 of the main arm 46. The hydraulic cylinder 76 (FIG. 4) is then actuated to cause the rack 74 to rotate the pinion 72 and shaft 52 in the anticlockwise direction. This raises the main arm 46 towards its first position. After travelling through approximately 15° the main arm reaches a position in which the block 90 contacts the block 92 on the secondary arm 48, and raises the secondary arm.

On reaching its first position, the main arm 46 is halted by contact of the stop blocks 86 and 88, and the secondary arm 48 acts upon the buffer 98 (FIG. 3) to dampen the last part of the movement of the two arms, 46 and 48. The arm 48 carries the carriage 110 located in the track section 50 into its raised or partly raised position, while the arm 46 carries the carriage 110 of the used tool into the magazine track 28.

With the track portion 54 of the main arm 46 thus completing the track 28 at the tool-change station 49, the arrest device 130 (FIG. 2) is actuated to retract the bar 132, and the carriages 110 are driven forward in the anti-clockwise direction by a distance approximately equal to the length of one carriage 110. The bar 132 is then re-extended and the carriages 110 are driven a short distance in reverse, to ensure that the carriage 110 bearing the next tool required is accurately centred in the track portion 54 of the main arm 46, this being ensured by the engagement of the bar 132 with the roller 118 of the adjacent carriage 110.

The cylinder 76 (FIG. 4) is then actuated to cause the main arm 46 to be lowered to its second position, the secondary arm 48 lowering simultaneously for the first 75° of the stroke of the main arm 46. When the main arm 46 enters its second position the tool holder 114 is gripped by the spindle 16 and released from its carriage 110. The spindle 16 is then lowered to its working position and the next phase of machining commences.

Since the track 28 has been completed by the lowering of the secondary arm 48, the carriages can again be driven around the track as described above to locate the next tool required in position adjacent to tool-change station 49 held by the pins 134 and ready for insertion into the main arm 46 when it is next raised.

SIMULATOR UNIT

It will be noticed that this manner of tool-changing causes the sequence of the tools in the magazine to change. According to the invention the machine includes a simulator unit which ensures that the tools are inserted in the spindle 16 in the correct order. This simulator unit will now be described, together with other components affecting the drive of the toothed wheel 140 (FIG. 5).

Figure 6:
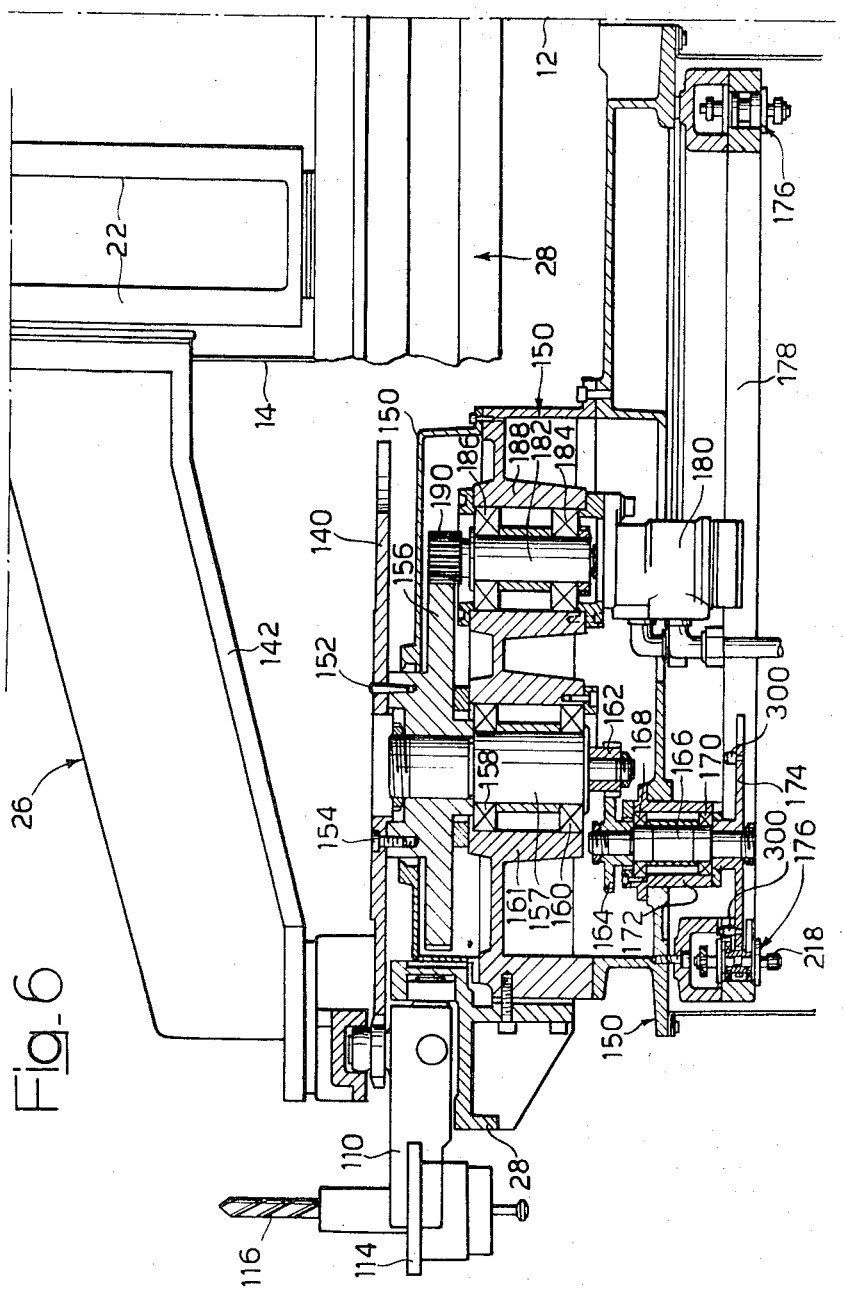
FIG. 6 is a sectional view on the line VI—VI of FIG. 5.

As is best seen in FIG. 6, there is a housing 150 under the plate 142 of the bracket 26, the housing consisting of various shaped parts bolted together and rigidly connected to the column 12 to form a box-like support in which other components are mounted. The wheel 140 is fixed coaxially by studs 152 and screws 154 to a gear wheel 156 fast on a shaft 157 that is rotatable in bearings 158 and 160 in a boss 161 forming part of the housing 150. A pinion 162 is fixed on the lower end of the shaft 157 and engages in a 1:2 ratio with another pinion 164 fast on a shaft 166. The shaft 166 is rotatable in bearings 168 and 180 in another boss 172 of the housing 150. Fast with the lower end of the shaft 166 is a toothed wheel 174 whose function is to drive a number of simulator elements 176 around an endless simulator track 178 which will be further described below. There are as many simulator elements 176 as there are carriages 110 in the magazine track 28.

Fixed to the housing 150 is a hydraulic motor 180 which is coupled to the lower end of a shaft 182 rotatable in bearings 184 and 186 in a boss 188 forming part of the housing 150. Fixed to the upper end of the shaft 182 is a pinion 190 which engages with the wheel 156. The supply circuit and construction of the motor 180 are not shown, being of a type known in the art.

The position of some of these components is seen in ghost lines in plan in FIG. 5, which also shows the position of a shunting station 219 comprising a gap in the simulator track occupied by a slide 192 adapted to accommodate two simulator elements 176, one of which is shunted out of the track 178 and thus temporarily isolated from it. A hydraulic cylinder 194 actuates the slide 192. Also seen in FIG. 5 at a reading station 191 adjacent the slide 192 is a reading device including a pair of feelers 196, 260 (FIG. 11) of which only the upper one 196 is visible in FIG. 5.

Figure 11:
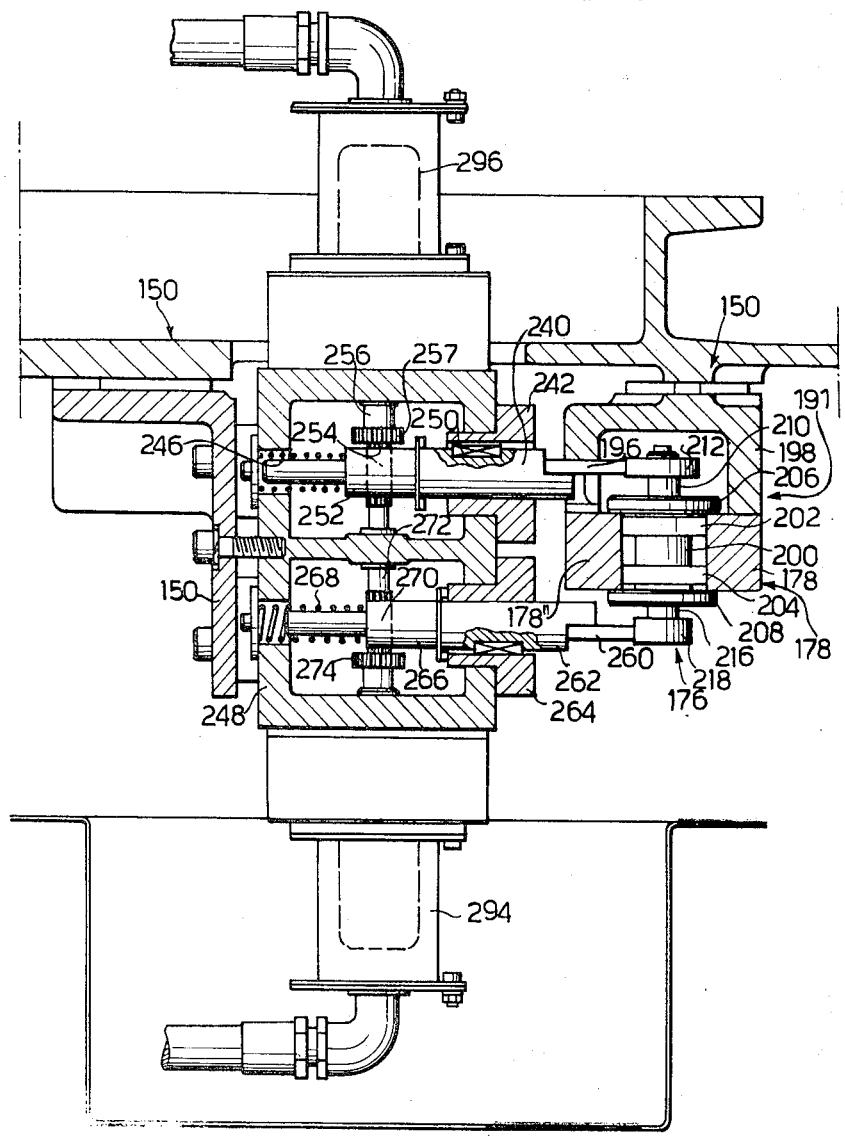
FIG. 11 is a view on an enlarged scale along the line XI—XI of FIG. 7.

As is best seen in FIG. 11, the simulator track 178 consists of two rails 178' and 178'' of rectangular cross-section spaced apart and supported at intervals from above the brackets 198 attached to the housing 150. Each simulator element 176 comprises a bushing 200 located between the rails of the track 178 and carrying two rollers 202,204 which engage the vertical sides of such rails. An upper and a lower retaining ring 206,208 hold the elements 176 against vertical movement on the track 178. Extending into the bushing 200 are an upper rod 210, on which is rotatably mounted an upper circular cam 212, and a similar lower rod 216, on which is rotatably mounted a circular lower cam 218. The diameters of the cams 214 and 218 are varied so that each element 176 is distinguished from the others by its combination of cam diameters. The wheel 174 which engages the elements 176 on the track 178 is so arranged (FIG. 6) as to engage with the bushing 200 of the elements 176. A portion of one of the rails of the track 178 is cut away to allow it to do so.

Figure 10:
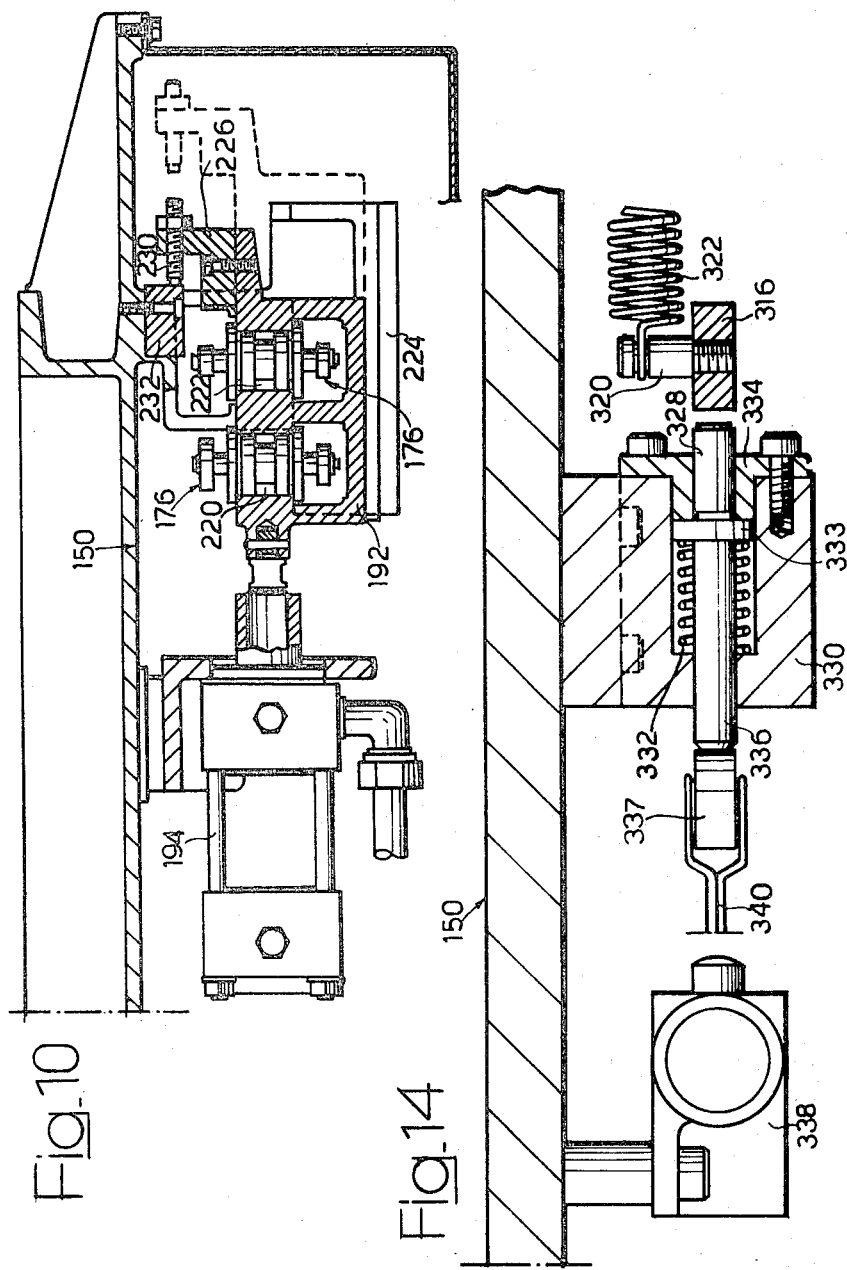
FIG. 10 is a view on an enlarged scale along the line X—X of FIG. 7.

The slide 192 is best seen in FIGS. 7 and 10. It has a generally rectangular body slidable along its long dimension transversely in a gap in the simulator track 178. The slide 192 comprises two compartments 220 and 222 which may be regarded as two sections of the track 178 supported parallel to each other, each of a length such as to accommodate one simulator element 176. The slide 192 is movable on guides 224 secured to the housing 150 between a so-called second position seen in FIGS. 7 and 10 in which the compartment 220 is shunted out of the simulator track 178 and the compartment 222 is aligned with the track, and a first position (not illustrated) in which the compartment 220 is aligned with the simulator track and the compartment 222 is shunted out of the track. The second position corresponds to the situation in which the main arm 46 and secondary arm 48 of the machine are in their second position and the magazine track 28 is completed by the track section 50 of the secondary arm 48, as shown in FIG. 3. The first position of the slide 192 corresponds to the reverse situation in which the two arms 46 and 48 are in their first position, the magazine track 28 being completed by the track section 54 of the main arm. It will therefore be clear that, in the simulator unit, the compartment 220 of the slide 192 corresponds to the track section 54 of the main arm 46, and the compartment 222 corresponds to the track section 50 of the secondary arm 48.

The slide 192 has at one end a vertical lug 226 (FIG. 10) with oblique end surfaces, as viewed in FIG. 7. Attached to the lug 226 is a limit screw 230 adapted to abut on a fixed stop block 232 (FIG. 10) to define the limit of the return stroke of the piston in the cylinder 194 and thus to locate the slide 192 accurately in its second position. The limit of the advance stroke of the piston in the cylinder 194 is defined by stop means within the cylinder and not seen in the drawings. The hydraulic cyclinder 194, which controls the movement of the slide 192, is connected in parallel with the cylinder 76 (FIG. 4) controlling the movement of the main arm 46 and secondary arm 48, so that movements of the slide 192 occur simultaneously with movement of the arms 46 and 48.

Fixed to the housing 150 on either side of the lug 226 on the slide 192 are two micro-switches 234 and 236 (FIG. 7). The switch 234 is actuated by the lug 226 when the slide enters its second position and is released when it leaves that position. The switch 236 is conversely actuated by the lug 226 when the slide enters its first position and is released when the slide leaves that position. The switches 234 and 236 form part of a system of electrical checks ensuring that each operation involving a movement of a mechanical component is properly carried out before the next operation takes place.

The reading device seen in FIG. 7 and 11 at the reading station 191 comprises an upper feeler 196 attached to a rod 240 that is slidable transversely of the simulator track 176 in a guide bush 242, being biased outwardly by a spring 246. The guide bush 242 is in turn fixed in a box-like casing 248 that is attached to the housing 150. The rod 240 has a longitudinal groove 249 accommodating a spike 250 that is fixed in the bush 242 and hold the rod and the feeler 196 against rotation. A portion of the rod 240, between the feeler 196 and the spring 246, is formed as a rack 252 that engages a pinion 254 on a shaft 256 (FIG. 11) that is set in bearings in the casing 248. Also fixed in the shaft 256 is a gear 257.

The feeler 196 is located at a vertical level such that it contacts the upper cam 212 on each simulator element 176 in turn as the element 176 passes along the simulator track. The feeler 196 and accordingly the rod 250, are displaced transversely by a distance determined by the diameter of the cam 212. This distance determines the extent of rotation of the pinion 254.

A similar construction is present at the level of the lower cam 218 on the simulator element 176. There are provided a feeler 260, rod 262, guide bush 264, rack 266, spring 268, pinion 270, shaft 272, and gear 274.

Figure 9:
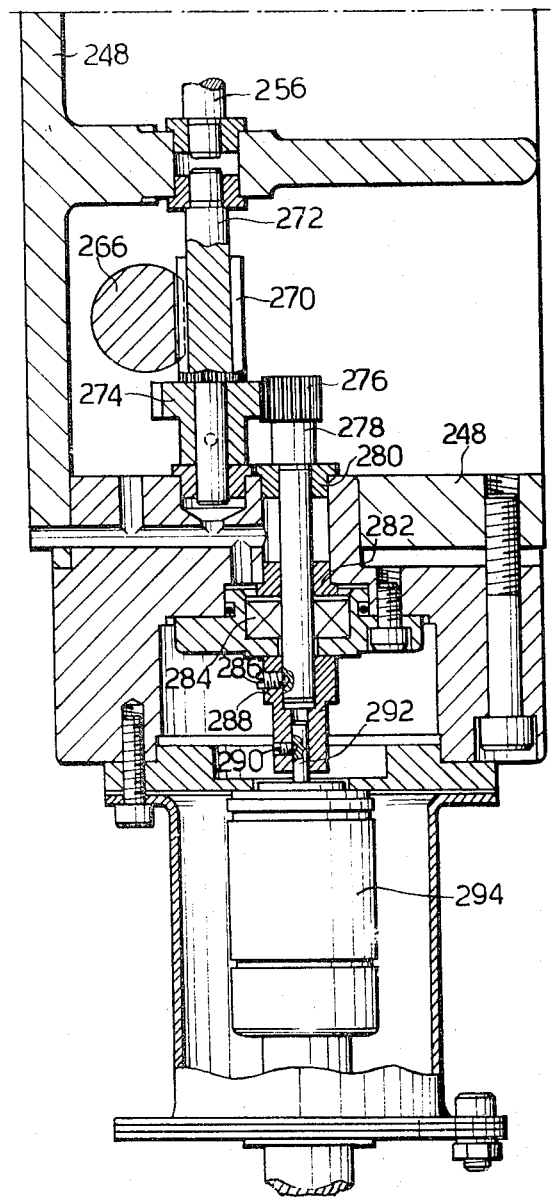
FIG. 9 is a view on an enlarged scale along the line IX—IX of FIG. 7.

As is seen in FIG. 9, the gear 274 meshes with another gear 276 of smaller diameter fixed on a shaft 278 that extends through bushes 280, 282 and a bearing 284 to project below the casing 248. Its projecting end is secured by a screw 286 to a sleeve 288 to which is also secured, by means of a screw 290, a shaft 292 of a resolver unit 294, that is bolted to the casing 248. By this arrangement motion is transmitted from the feeler 260 to the shaft 292 of the resolver unit 294. This unit is of a known type and its internal construction is not illustrated. The function of the unit is to emit an electrical signal corresponding to the angular position of one of its components, a rotor, which is rotated by means of the shaft 292.

By means of a construction similar to that seen in FIG. 9, the upper feeler 196 transmits rotary motion to a shaft of a second and upper resolver unit 296 (FIG. 11) which functions similarly to the lower unit 294.

FIG. 15 shows a block diagram of the control unit of the machine according to the above-mentioned patent application, including a computer 291 which controls the operation of the machine according to a programme fed to it in such form as punched tape. When the programme calls for the next required tool 116 to be brought to the tool-change station, the computer 291 conveys a signal to a numerical-analogical converter 293 of a known type. The signal is specific to the tool 116 required, and corresponds to the carriage 110 bearing that tool 116, since the tools 116 are initially inserted in the magazine of the machine in a predetermined order so that each may be identified by the carriage 110 bearing it.

When the computer responds to the instruction in the programme to bring the next required tool 116 to the tool-change station, the main and secondary arms 46 and 48 are in their lowered second position (FIG. 3) and the slide 192 is also in its second position (FIG. 7). The carriages 110 begin to move along the track 28, and there is a corresponding movement of the simulator elements 176 along the simulator track 178 in a clockwise direction as viewed in FIG. 7.

The signal identifying the next required tool 116, as emitted by the computer 291, is converted by the converter 293 into two analogical signals of a value corresponding to the required tool 116 and its carriage 110. These signals are conveyed to a differential amplifier 450, to which are also conveyed the signals emitted by the resolver units 294 and 296. The error signal emitted by the amplifier 450 pilots a servo-mechanism 295 controlling the motor 180 that drives the wheel 140. The error signal varies in value since the position of the rotors of the resolver units 294 and 296 changes according as the simulator elements 176 pass the feelers 196 and 260 at the reading station. The servo-mechanism 295 is arranged to stop the motor 180 when the error signal is zero. The zero error signal corresponds to the arrival of the required simulator element 176 at the reading station, and thus to the arrival of the next required tool 116 in its carriage 110 at the position in the track 28 adjacent the tool-change station and at the limb 66 of the bracket 24.

The feelers 196 and 260 are constantly in movement while the simulator elements 176 pass along the simulator track 178 and move into and past the reading station. There is thus a possibility that a zero error signal might be emitted by the resolvers 294 and 296 at a time when the required simulator element 176 is not in fact located at the reading station. To avoid this possiblity, a switch 305 (FIGS. 8, 12) to be described in detail below is provided. The switch 305 is closed only for the short intervals when a simulator element 176 is located at the reading station, and not in any intermediate position. The servo-mechanism 295 is arranged to drive the motor 180 constantly during this intermittent closing and opening of the switch 305, until a zero signal is emitted by the resolvers 294 and 296.

Figure 8:
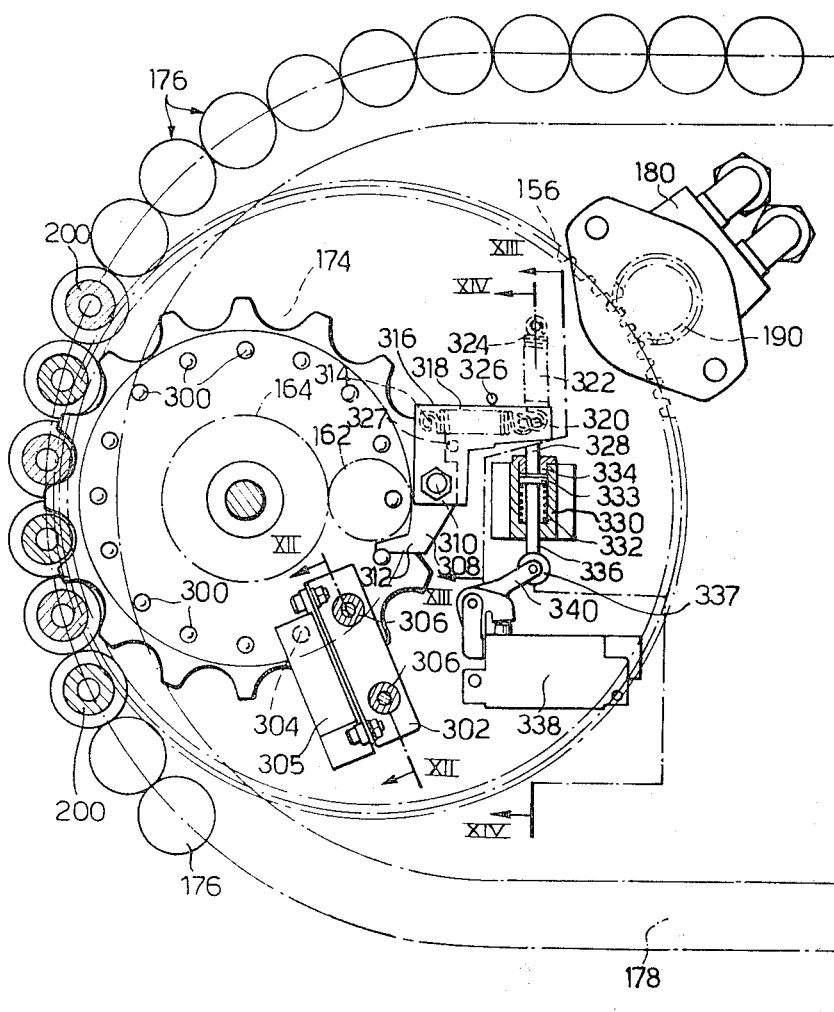
FIG. 8 is a partly sectioned plan view through another part of the simulator unit.
Figure 12:
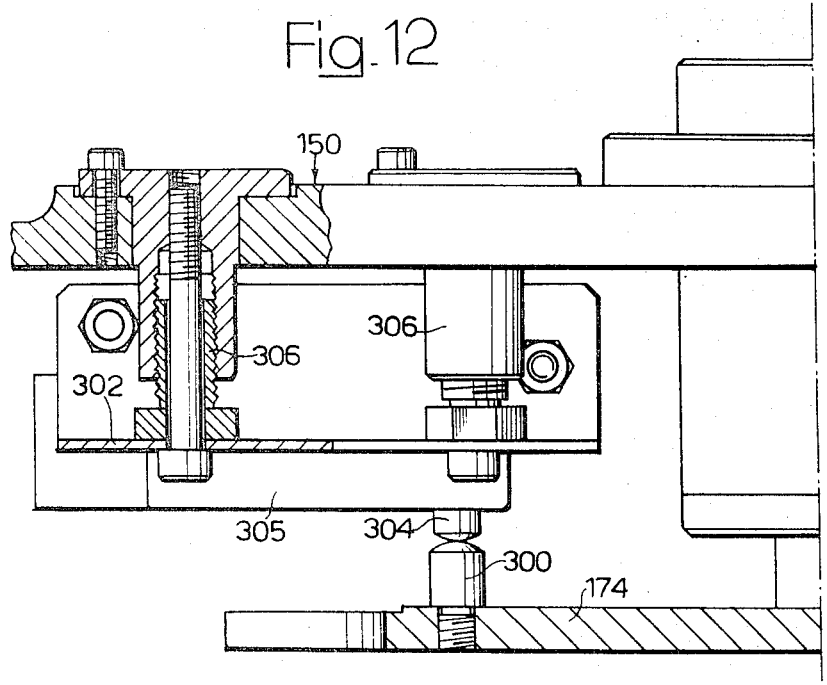
FIG. 12 is a section on an enlarged scale along the line XII—XII of FIG. 8.

The arrangements for operating the switch 305 are best seen in FIGS. 8 and 12. The toothed wheel 174 which drives the simulator elements 176 around the simulator track 178 has on its upper surface a series of projecting studs 300, equal in number to the number of carriages 110 and spaced apart in a circle concentric with the wheel 174.

Mounted on a part of the housing 150 above the studs 300 is a bracket 302 (FIG. 12) from which projects downwardly a button-type actuator 304 of the switch 305. The actuator 304 is so located that is is engaged by each of the studs 300 in turn as they pass below it in rotation of the wheel 174. Adjustable screws 306 allow the bracket 302 and thus the switch 305 to be accurately positioned on the housing 150. The studs 300 are so distributed that they engage the actuator 304 to close the switch 305 precisely at the moment when a simulator element 176 is located at the reading station and the cams 212,218 of that simulator element 176 have moved the feelers 196 and 260 to their definitive positions. It is therefore in this instant that the error signal corresponding to that element 176 is transmitted by the resolvers 294 and 296 to the servo-mechanism 295 as explained above.

If the error signal has a value other than zero, the servo-mechanism 295 does not interrupt the rotation of the motor 180. If, however, the error signal is zero, indicating that the next required tool 116 has arrived in position adjacent the tool-change station in the track 28, the servo-mechanism 295 causes the motor 180 to stop.

As was mentioned earlier, the motor 180 is reversed (by switch means not illustrated) after it has stopped, its reverse movement serving to located the carriages 110 accurately in position at and adjacent to the tool-change station in the track 28.

Figure 13:
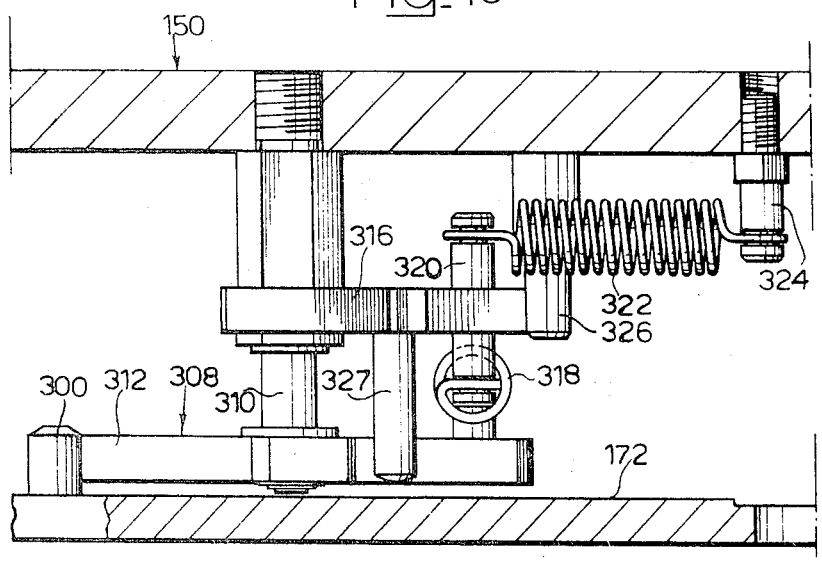
FIG. 13 is a section on an enlarged scale along the line XIII—XIII of FIG. 8.

Reversing occurs under the action of a device now to be described, and illustrated in FIGS. 8, 13 and 14. It comprises a first rocker 308 oscillable about a pivot 310 secured to a part of the housing 150. A second rocker 316 of L-shape is also arranged to oscillate about the pivot pin 310, which passes through the free end of one of its arms.

A spring 318 is connected between a pin 314 on the rocker 308 and a pin 320 attached to the free end of the second rocker 316. A second spring 322 is connected between the pin 320 on the second rocker 316 and a pin 324 fixed to the housing 150. The springs 318 and 322 are at right angles to each other. Another pin 326 is fixed to the housing 150 and acts as a stop for the movement of the rocker 316 under the action of the spring 322. A further pin 327 is fixed to the rocker 316 in the path of the arm of the rocker 308.

Spaced away from the rocker 316 opposite the spring 322 is a rod 328 mounted in a guide block 330 fixed to the housing 150 and biased by a spring 332 towards the rocker 316. The rod 328 is normally stopped by a flange 333 against a bush 334 fixed in the guide block 330. The rod 328 has a rearwardly projecting end 336 which co-operates with a roller 337 of an actuator arm 340 of a microswitch 338.

The device described above is arranged so that, under the normal biasing influence of the springs 318 and 322, a finger 312 of the rocker 308 projects into the path of the studs 300 on the wheel 174. This wheel normally rotates clockwise, as viewed in FIG. 8. As each stud 300 passes the finger 312 of the rocker 308, it pivots this rocker anticlockwise about the pin 310 away from the position illustrated in FIG. 8. This movement is opposed by the spring 318, which returns the rocker 308 to its original position as soon as the stud 300 has passed by. The rocker 316 is not moved as the action of the spring 322 prevails over that of the spring 318, and the pin 326 prevents it from pivoting anticlockwise from the position seen in FIG. 9.

However, when the motor is reversed and the wheel 174 moves anti-clockwise, the stud 300 nearest the rocker 308 engages its finger 312 to pivot this rocker in a clockwise direction about the pivot 310. By engaging against the pin 327, the rocker 308 transmits movement to the rocker 316, moving it in a clockwise direction about the pivot 310 against the action of the biasing spring 322. This movement causes the rocker 316 to contact the rod 328 and move it backwards against the action of its spring 332. The projecting end 336 of the rod accordingly engages the roller 327 of the arm 340 of the microswitch 338, and actuates this switch.

Through an electrical circuit not illustrated, actuation of the switch 338 causes the motor to stop, with the carriages 110 and simulator elements 176 in the correct positions for the next step in the tool-changing operation. The signal of the switch 338 is also co-ordinated with that from another switch (not illustrated), that is actuated by the main arm 46 in a check circuit to ensure that all the mechanical components are correctly arranged for the tool-changing operation.

OPERATION OF SIMULATOR UNIT

The operation of the simulator unit is as follows. When the arms 46 and 48 are in the position seen in FIG. 3 and the spindle 16 is operating on the workpiece, the slide 192 (FIG. 7) is in its second position, with the compartment 222 aligned as shown with the simulator track 178. As already mentioned, the combination of the diameters of the cams 212 and 218 (FIG. 11) of the simulator elements 176 identifies the tools 116 (FIG. 2) and therefore the tool-carrying carriages 110. The elements 176 are therefore arranged on the track in the order of the corresponding carriages 110 on the track 28. The element 176 located in the compartment 220 (FIG. 7) corresponds in turn to the carriage 110 located in the arm 46 (FIG. 3) and therefore to the tool 116 engaged in the spindle 16.

During the operation carried out by this tool the wheel 140 (FIG. 6) advances the carriages 110 to preposition the new tool required, while the wheel 174 advances the simulator elements 176. When the feelers 196 and 260 (FIG. 11) read the simulator element corresponding to the next tool required, they cause the motor 180 (FIG. 6) to stop, as has been described above, so that the new tool is located in the position adjacent the tool-change station, and the element 176 that has been read is located in the reading station which is adjacent the slide 192.

After the return of the used tool into the carriage 110 of the arm 46 (FIG. 3), the two arms 46 and 48 are rotated in the anticlockwise direction. The slide 192 (FIG. 7) is simultaneously moved into its first position in which the compartment 220 is aligned with the track 178.

Advance of the simulator elements 176 by one position then occurs, corresponding to advance of the next required tool into the tool-change station from the position adjacent that station. The simulator element 176 corresponding to the next tool required is thus moved in this step from the reading station into the compartment 220, and the element 176 formerly in the compartment 220 is pushed forward and returned to the simulator track 178. The element 176 in the compartment 222 of the slide 192 remains shunted out of the track 178, corresponding to the carriage 110 which at this moment is held in the track portion 54 of the secondary arm 48, raised in its first position.

When the arms 46 and 48 then move to their second position, the slide 192 returns simultaneously to its second position and the compartment 220 is once again shunted out of the simulator track 178, thus isolating the element corresponding to the tool selected.

ELECTRICAL READING DEVICE

The mechanical reading device described earlier may be replaced by an electrical variant seen in FIGS. 16 to 20. The simulator elements 400 used with this variant are different from the elements 176. Each element 400 comprises an upper disc 402 which slides on the upper surface of the track 178 and from which projects downwardly a rod 406. A lower disc 404 slides on the lower surface of the track and carries an upwardly projecting rod 408. The rods 406 and 408 are fixed in a sleeve 410 on which are rotatably mounted bearing rings 412, 414 which engage the vertical sides of the track 178. On the undersurface of the disc 402 are two spaced apart pins 414 on each of which is mounted a bearing ring 416, the two rings 416 of each element 400 being located in such a manner that they engage one of the rails of the track 178 and prevent the element 400 from rotating about its own axis.

The upper surface of the disc 402 carries a number of code studs 420 with substantially prismatic heads 421 that thus have a width less than the diameter of the studs, in such a manner that the two rows do not overlap in the direction of movement of the elements 400. The studs 420 are arranged in two parallel rows extending transversely of the track 178, the studs of one row being staggered with respect to those of the other. The number and position of the studs 420 varies for each element 400, so that each element is identified by the combination of studs 420 it carries. The studs 420 of one row represent in binary code the units of the decimal numbers which identify the tools, while the studs 420 of the other row identify in code the tens. An element with the maximum number for the machine is seen in FIG. 19: it has two complete rows of five studs each. Elements with other permutations are seen in FIG. 16. Each element 400 also carries a so-called strobe stud 422 with a cylindrical head and a diameter far smaller than that of the studs 420. The stud 422 is located in a fixed position at the end of one of the rows and is centralised with respect to the diameter of the studs 420 of that row. The stud 422 has the object of establishing with precision the instant in which the studs 420 should be read.

A fixed reading head 424 is mounted at the reading station. It comprises a bracket 426 fixed to the track 178 by bolts 428. Secured to it at one end is a U-shaped bracket 430 which contains in its cavity five rectangular blocks 432 associated with the studs 420, further separated by spacers 434 and secured to the bracket 430 by a transverse bolt 436. Each block 432 carries a proximity switch 438 adapted to co-operate with a stud 420 of an element 400 when the element passes directly below the reading head 424 and to generate an electrical signal. The proximity of the head 421 of a stud 420 and of the head of a stud 422 from a switch 438 must be less than a determined value, of the order of a few millimeters, for the switch to operate, but actual contact is not necessary, as is well known for this type of switch.

Accurate positioning of the blocks 432 is obtained by adjusting screws 440 which extend through the bracket 426 into threaded holes in the body of the blocks 432, and locking screws 442 which extend through threaded holes in the bracket 426 and bear on the surface of the blocks 432.

At the other end of the bracket 426 is secured a further U-shaped bracket 444 which accommodates six blocks 432 also carrying proximity switch members 438 and held in place by a transverse bolt 446 and by adjusting and locking screws 440 and 442. Five of the blocks 432 in the bracket 444 correspond to studs 420 on the elements 400, and the sixth, 432A, to the strobe stud 422.

The electrical circuit used with the variant of FIGS. 16 to 19 is not shown in detail, but the principles of operation will be clear from FIG. 20. The machine has a computer 291 which identifies the tool required in a numerical binary-decimal value. When the strobe switch 432A is actuated to allow the reading operation to take place, the reading heads 424 generate directly certain electrical signals which indicate in binary numerals the identity of the element 400 which at that instant is immediately below the head. These signals are compared in a comparator 451 with those emitted by the computer 291 to generate an error signal if there is not equality, and a zero error signal is there is equality. The zero error signal actuates the servo-mechanism 295 of the motor 180, so arresting the wheel 140 which causes the carriages 110 to circulate along the magazine track 28. The remainder of the operation takes place analogously to that in the embodiment of FIGS. 1 to 15.

The reading head 424 thus renders unnecessary the resolvers 294,296, the converter 293 and the switch 305 of the other embodiment.

It is intended that various modifications and improvements could be made to the machine described without departing from the scope of the invention. In particular, the tool-change could take place in any other manner, than that described, for example by means of a rotary arm adapted to engage simultaneously the tool in the spindle and the selected tool in the magazine and to convey the former to the position of the latter and vice versa.

It will be clear that the invention greatly simplifies the problem of tool identification and recovery existing in previous machining centres. Moreover, direct reading of the tools or their holders is unnecessary. Once a tool has been introduced into a correctly identified carriage, the simulator unit automatically ensures that the tools will be introduced into the spindle of the machine, regardless of the order of the carriages in the magazine track.

What we claim is:

1. A machine tool with automatic tool-change, including a spindle, a series of tools, a magazine for the tools, first moving means to move the tools in a path which includes a tool-change station, and tool-change means to transfer a tool from the tool-change station to the spindle wherein the improvement comprises a simulator track separate from said path and simulating the path of the tools, a series of simulator elements associated with said tools and separate therefrom, said simulator elements carrying identifying indicia so that each of said simulator elements corresponds to one of said tools, second moving means to move said simulator elements along the simulator track concurrently with the movement of said tools, a reading device located at a reading station on the simulator track and adapted to read the identifying indicia of the simulator elements as they pass the reading station, and means to render ineffective said first and said second moving means to cause the arrest of said tools and said simulator elements when the reading device reads a simulator element of said series of elements corresponding to a required one of said tools, said tools being located at a predetermined position relative to said tool change station in the path of the tools.

2. A machine tool with automatic tool-change, including a spindle, a series of tools, a magazine for the tools, first moving means to move the tools in a path which includes a tool-change station, and tool-change means to transfer a required tool from the tool-change station to the spindle, wherein the improvement comprises a simulator track simulating the path of the tools and a series of simulator elements movable along the simulator track and carrying identifying indicia so that each of said simulator elements corresponds to one of said tools, a reading device loacted at a reading station on the simulator track and adapted to read the identifying indicia of the simulator elements as said indicia pass the reading station, and means to cause the arrest of said tools and said simulator elements when the reading device reads the simulator element of said series of elements corresponding to the required tool being located at a predetermined position relative to said tool change station in the path of the tools; the tool-change means returning a used tool from the spindle to the magazine to occupy the position of the required tool transferred from the magazine to the spindle, the simulator track including a shunting station and means located at the shunting station to shunt a selected simulator element temporarily out of the simulator track.

3. The machine of claim 2, in which the means to shunt the selected simulator element comprises a slide movable transversely in a gap in the simulator track at the shunting station and comprising two compartments, each corresponding to a length of the simulator track sufficient to accommodate one simulator element, the slide being movable between a first position in which a first one of said two compartments occupies the gap in the simulator track while the second one of said compartments is isolated from the simulator track, and a second position in which the second of the compartments occupies the gap while the first of the compartments is isolated from the track.

4. The machine tool fo claim 3, including means to move the slide between said first and second positions simultaneously with actuation of the tool-change means.

5. The machine tool of claim 1, in which the indicia on the simulator elements are cams of differing dimensions, the reading device comprising a feeler adapted to engage a cam of each of said elements and to be displaced by a distance corresponding to the dimension of the engaged cam.

6. The machine tool of claim 5, in which there are a plurality of cams on each simulator element the reading device including a feeler for each cam.

7. The machine tool of claim 1, in which the indicia on the simulator elements are members of proximity switches, the reading device comprising a fixed head carrying further members of said proximity switches, adapted to co-operate with the members on the simulator elements; each combination of said proximity switch members on the simulator elements being different for each of said simulator elements.

8. A machine tool with automatic tool-change, including a spindle, a series of tools, a magazine for the tools, first moving means to move the tools in a path which includes a tool-change station, and tool-change means to transfer a required tool from the tool-change station to the spindle, wherein the improvement comprises a simulator track simulating the path of the tools and a series of simulator elements movable along the simulator track and carrying identifying indicia so that each of said simulator elements corresponds to one of said tools, a reading device located at a reading station on the simulator track and adapted to read the identifying indicia of the simulator elements as said indicia pass the reading station, and means to cause the arrest of said tools and said simulator elements when the reading device reads the simulator element of said series of elements corresponding to the required tool being located at a predetermined position relative to said tool change station in the path of the tools, the reading device including a member adapted to be moved mechanically by the simulator elements, said member causing rotary movement of a resolver unit having means for emitting an electrical signal corresponding to said resolver unit's angular position, and including means to control the movement of the simulator elements and said tools in response to the value of the signal emitted by the resolver unit.

9. A machine tool with automatic tool-change, including a spindle, a series of tools, a magazine for the tools, first moving means to move the tools in a path which includes a tool-change station, and tool-change means to transfer a required tool from the tool-change station to the spindle, wherein the improvement comprises a simulator track simulating the path of the tools and a series of simulator elements movable along the simulator track and carrying identifying indicia so that each of said simulator elements corresponds to one of said tools, a reading device located at a reading station on the simulator track and adapted to read the identifying indicia of the simulator elements as said indicia pass the reading station, and means to cause the arrest of said tools and said simulator elements when the reading device reads the simulator element of said series of elements corresponding to the required tool being located at a predetermined position relative to said tool change station in the path of the tools, the magazine comprising an endless magazine track along which a series of carriages is slidable, the carriages being unconnected to each other, the first moving means including a wheel engaging at least one of the carriages to push the carriages along the magazine track, said wheel being connected in a fixed rotary relationship to a further wheel that engages at least one of the simulator elements to move said elements along the simulator track.

10. The machine tool of claim 9, in which the tool-change means comprises a member movable between a first position in which it supports the required tool at the tool-change station and a second position in which it supports the required tool at the spindle and in which the tool-change station comprises a gap in the magazine track and the tool-change member includes a section of track adapted to complete the magazine track when the tool-change member is in its said first position.

11. The machine tool of claim 10, in which the tool-change means also includes a carrier member carrying an auxiliary track section and movable between a first position in which the auxiliary track section is spaced away from the magazine track and a second position in which the auxiliary track section is located in the track gap at the tool change station and completes the magazine track.

12. The machine tool of claim 11, in which the carrier member is arranged for movement simultaneously with the tool-change member between their said respective first and second positions.

13. The machine tool of claim 12, in which the tool-change member comprises a main arm arranged for pivotal movement between its said first and second positions, and in which the carrier member comprises a secondary arm mounted for pivotal movement about the same axis as the main arm.

14. The machine tool of claim 13, in which the secondary arm is rotatable independently of the main arm about their said common axis of pivotal movement.

15. The machine tool of claim 14, in which the secondary arm is arranged to move through a lesser angle between its said first and second positions than is moved through by the main arm between its said first and second positions.

16. The machine tool of claim 14, including means to move one of the arms between its first and second positions, and formations on the arms adapted to contact each other so that the movement of the one arm is transmitted through such formations to the other arm.

17. The machine tool of claim 9, in which the first moving means for moving the carriages along the magazine track is reversed following the arrival of the required tool at the predetermined position in the magazine track, means for reversing said first moving means comprising a series of studs carried by a rotary member that rotates with movement of the simulator elements along the simulator track, and collaborates with a rocker device including a finger on a rocker that is located in the path of the studs, reversing movement of the rotary member causing the finger to be engaged by one of said studs and to oscillate a rocker arranged to actuate an electrical switch on such reversing movement causing stoppage of the first moving means and thereby the carriages.

* * * * *